(12) United States Patent
Gassmann (10) Patent No.: US 6,318,532 B1
(45) Date of Patent: Nov. 20, 2001

(54) EXTERNALLY CONTROLLED HYDRAULIC TORQUE TRANSFER DEVICE

(75) Inventor: Theodor Gassmann, Rochester, MI (US)

(73) Assignee: GKN Automotive, Inc.

( * ) Notice: Subject to any disclaimer, the term of this patent is extended or adjusted under 35 U.S.C. 154(b) by 0 days.

(21) Appl. No.: 09/602,497

(22) Filed: Jun. 23, 2000

(51) Int. Cl.[7] ................................................. F16D 43/284
(52) U.S. Cl. ........................ 192/35; 192/103 F; 180/249
(58) Field of Search ........................... 192/35, 57, 103 F; 180/249; 74/650; 475/88

(56) References Cited

U.S. PATENT DOCUMENTS 5,405,293 * 4/1995 Severinsson ........................ 192/35 X
5,687,824 * 11/1997 Hara et al. ....................... 192/85 CA

FOREIGN PATENT DOCUMENTS 0 570 841 A2 * 11/1993 (EP).

* cited by examiner

Primary Examiner—Rodney H Bonck
(74) Attorney, Agent, or Firm—Mick A. Nylander (57) ABSTRACT

A torque transfer device for use on an all wheel drive vehicle. The torque transfer device includes a differential housing. The torque transfer device includes a clutch assembly rotatably supported within the differential housing. The torque transfer device also includes a pump assembly connected to the clutch housing on one side thereof. The torque transfer device also includes a hydraulic assembly in contact with the pump on the side opposite the clutch. The hydraulic assembly is rotationally stationary with respect to the pump assembly. The torque transfer device also includes an axle housing rotatably fixed with respect to the differential housing. The hydraulic assembly is in contact with the axle housing.

20 Claims, 5 Drawing Sheets

EXTERNALLY CONTROLLED HYDRAULIC TORQUE TRANSFER DEVICE

BACKGROUND OF THE INVENTION

1. Field of the Invention

The present invention relates to differential drives generally, and more particularly, relates to a hydraulically controlled torque transfer device for use with a differential drive in a vehicle.

2. Description of Related Art

The differential drive is well known in the motor vehicle industry. The differential drive is used in conjunction with the transmission and drive shaft or propeller shaft to turn the automotive vehicle wheels at different speeds when the vehicle is going around a curve, to differentiate the speed of each wheel individually and to provide the proper amount of torque to each wheel in slipping, turning, or other road to wheel conditions.

In a common all wheel drive power train layout of a motor vehicle there is a primary driven front/rear axle and a secondary driven hang on axle that is connected via a prop shaft or drive shaft and a torque transfer coupling to the primary driven axle. The torque transfer coupling is usually directly in front of the secondary driven axle. The axle differential creates the division of power or torque to each side shaft of the axle. The primary driven axle also includes a differential which divides necessary power to the side shaft of each axle and then the wheels. The division of torque between the front and rear axles is completed by the torque transfer coupling which is a separate unit on the drive train system and requires space for its housing and other related parts. There are many different ways to provide torque transfer between the primary driven and the secondary driven axles.

The current state of the art includes friction clutch pack systems that use ball ramp mechanisms and also hydraulic or pump systems. A state of the art pump system utilizes two gear pumps arranged in a static housing one is running with primary axle speed and the other with secondary axle speed in a closed hydraulic circuit wherein each of the gear pumps feed each other. Another state of the art gear rotor pump system is based on a single gear pump. The above mentioned two gear pumps and single gear pumps tend to have difficulties in feeding and externally controlling the rotating pump and they are very complex and expensive to manufacture and seal.

Therefore, there is a need in the art for a hydraulically controlled pump based system for torque transfer control between a primary driven axle and a secondary driven axle in an all wheel drive vehicle. This new hydraulic torque transfer device should combine the simplicity of a single gear rotary pump (gerotor pump) with the advantage of a more complex two pump system that has a stationary hydraulic circuit.

SUMMARY OF THE INVENTION

One object of the present invention is to provide a new torque transfer device.

Another object of the present invention is to provide a torque transfer device that includes a hydraulic circuit that is stationary.

Yet another object of the present invention is to provide a torque transfer device that has easy access to control a hydraulic pressure for tuning characteristics of the torque transfer.

Yet a further object of the present invention is to provide a torque transfer device that has a quick response due to a high volume displacement pump.

Still a further object of the present invention is to provide a torque transfer device that has a reduced number of parts and is easier to manufacture.

Still another object of the present invention is to provide a torque transfer device that has a self-sealing pump arrangement.

A further object of the present invention is to provide a torque transfer device that has a large range of possible characteristics from degressive to progressive.

A further object of the present invention is to provide a torque transfer device that avoids complex valve schemes to separate pressure side from suction side in the hydraulic circuit.

Still a further object of the present invention is to provide a solenoid that acts as a switch or tuning feature to control the characteristics of the torque transfer device.

To achieve the foregoing objects the torque transfer device includes a differential housing. The torque transfer device further includes a clutch assembly, rotatably supported within the differential housing. A pump assembly is connected to the clutch housing on one side thereof. The torque transfer device includes a hydraulic assembly in contact with the pump on a side opposite of the clutch assembly. The torque transfer device also includes an axle housing which is rotatably fixed with respect to the differential housing. The hydraulic assembly is in constant contact with the axle housing. The hydraulic assembly is rotationally stationary with respect to the pump assembly.

One advantage of the present invention is that the torque transfer device has a hydraulic circuit that is stationary.

A further advantage of the present invention is that the torque transfer device has easy access control to the pressure characteristics and tuning of the torque transfer device.

Still a further advantage of the present invention is the quick response due to a high volume displacement pump in the torque transfer device.

Yet a further advantage of the present invention is the minimum number of parts and easier manufacturing of the torque transfer device.

A further advantage of the present invention is the self-sealing pump arrangement of the torque transfer device including the sealing disc, control disc, and pump housing.

Yet a further advantage of the present invention is the large range of possible characteristics and tuning from degressive to progressive of the torque transfer device.

Still a further advantage of the present invention is the nearly valveless scheme to separate the pressure side from suction side of the torque transfer hydraulic circuit.

Other objects, features, and advantages of the present invention will become apparent from the subsequent description and appended claims, taken in conjunction with the accompanying drawings.

DESCRIPTION OF THE PREFERRED EMBODIMENT(S)

Referring to the drawings, a torque transfer device 10 according to the present invention is shown.

Figure 1:
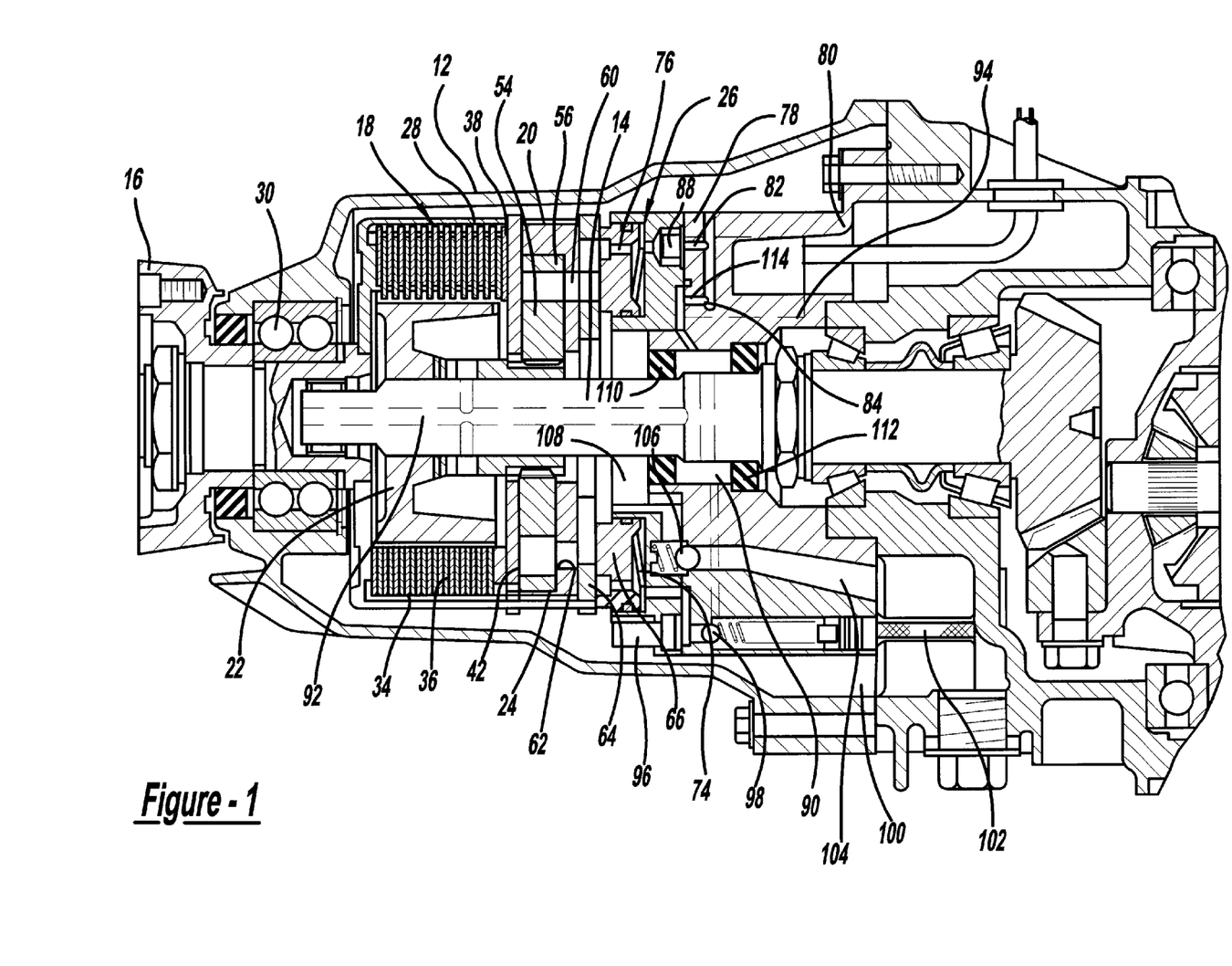
FIG. 1 shows a cross section of the present invention.
Figure 2:
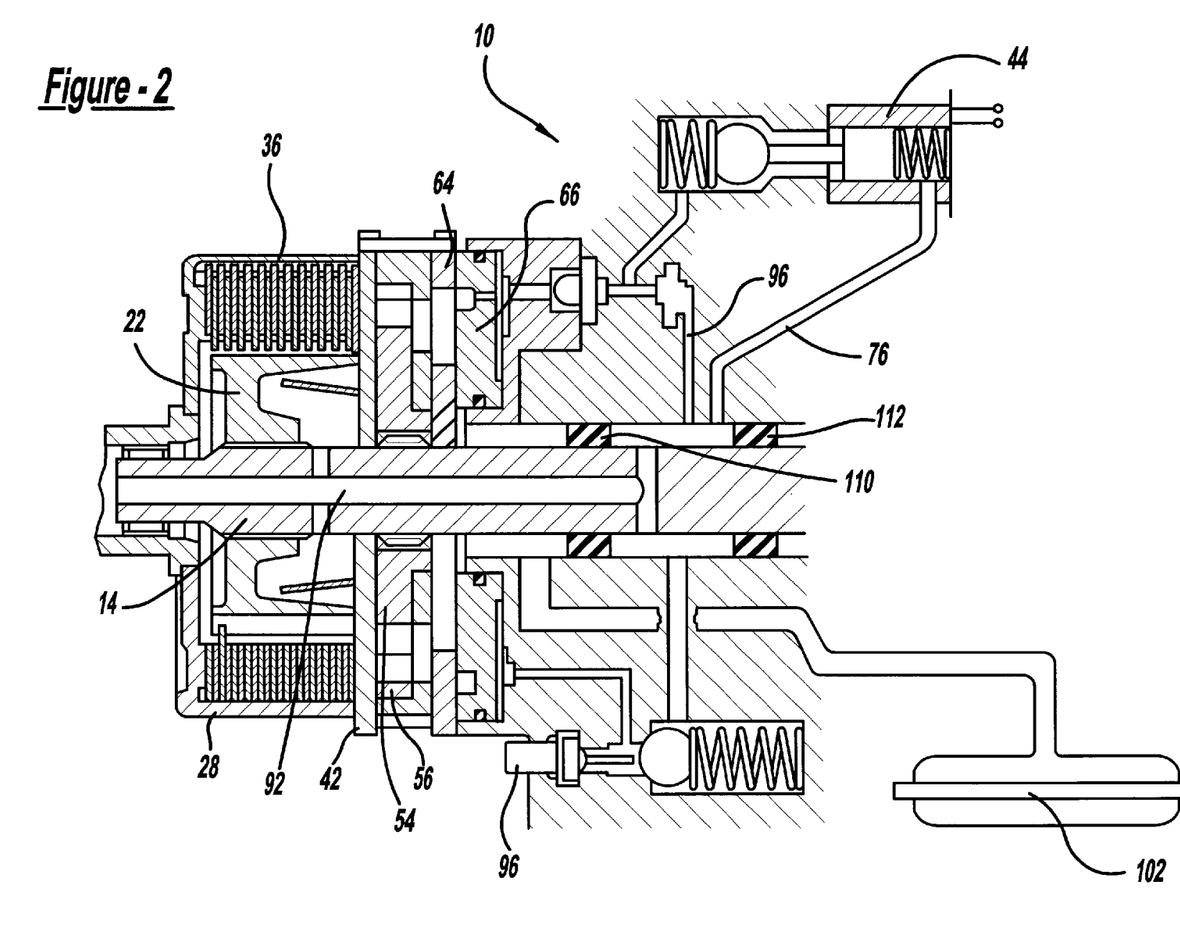
FIG. 2 shows a semi-cross section of the torque transfer device.

FIG. 1 shows a differential drive 12 for use on a secondary driven axle wherein the primary driven axle is the front wheel axle of the vehicle, however, it should be noted that the present invention can be used on a rear wheel drive primary driven axle vehicle or any other four wheel drive or all wheel drive vehicle. FIG. 1 takes a cross section through the differential drive housing 12 and the torque transfer device 10. The torque transfer device 10 is arranged on the pinion shaft 14 of the secondary driven differential. The torque transfer device 10 consists of the following basic units. The first is a companion flange 16 that is connected to the input shaft or prop shaft (not shown) from the primary driven axle. The companion flange 16 will rotate with an input speed that equals the prop shaft speed of the motor vehicle. Second, the torque transfer device 10 includes a clutch pack 18 and pump housing 20 which are rotatably connected to the companion flange 16 and also rotate at the input speed. Third, the torque transfer device 10 includes a clutch pack inner hub 22 which is connected to the axle pinion shaft 14. Fourth, the torque transfer device 10 also includes a gear rotary pump 24 (gerotor pump) arranged within the pump housing 20. The final basic unit of the torque transfer device 10 is the hydraulic system or assembly 26 which is located within the oil housing or differential drive housing 12.

As shown in FIG. 1, the companion flange 16 will connect to a prop shaft (not shown) which is connected on the opposite end to a primary driven axle and primary driven differential drive. The flange 16 is rotatably connected to a clutch pack housing 28. The clutch pack housing 28 is supported by ball bearings 30 with respect to the differential drive 12 which allows for the clutch pack housing 28 to rotate with respect to the differential drive housing 12. The clutch pack housing 28 includes a clutch pack 18 within its housing walls. The clutch pack 18 includes a clutch plate 34 which is connected to the clutch pack housing 28. Clutch discs 36 extend radially inwards from the clutch plate 34 towards the center line of the clutch pack 18. On the opposite side of the clutch disc 36 and disposed radially inward is the clutch hub 22. The clutch hub 22 is connected to the axle pinion shaft 14 by a set of teeth or any other well known securing method for securing a shaft with a hub. The clutch pack housing 28 will rotate with the input or prop shaft speed while the clutch hub 22 will rotate with the output or rear axle speed. In contact with the clutch discs 36 on one end thereof, is a pressure plate 38.

Figure 7:
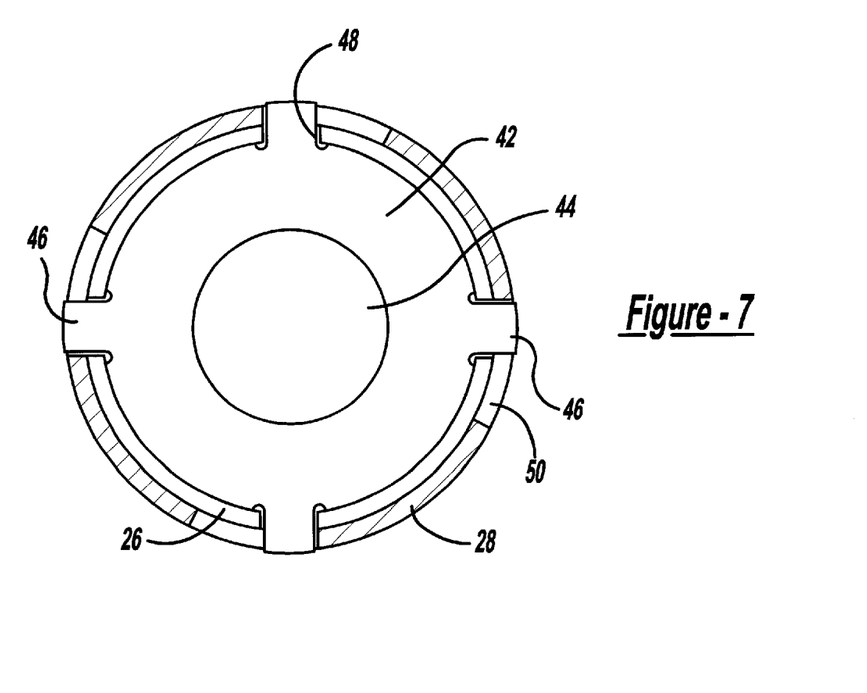
FIG. 7 shows a side view and partial cross section of the seal disc in the pump housing.
Figure 8:
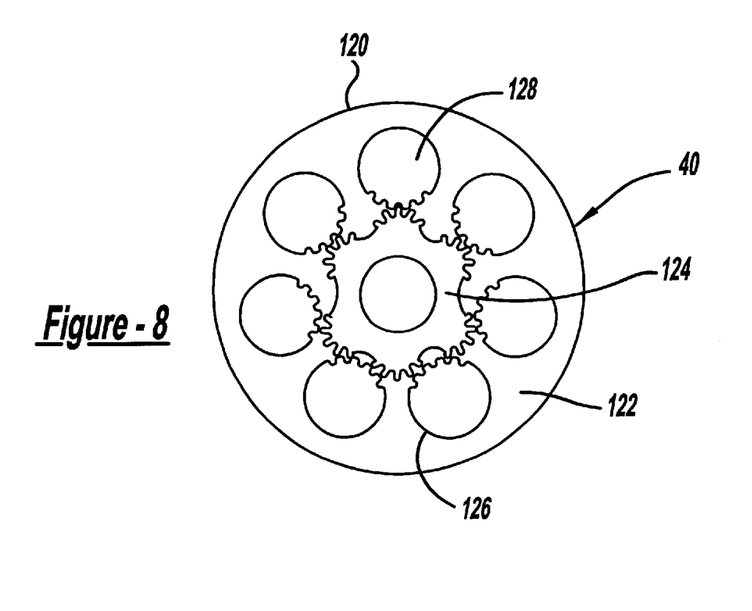
FIG. 8 shows a side view of the self-sealing planetary rotor pump.

Axially adjacent to the clutch pack 18 is the pump housing 20 and oil pump 24. In the preferred embodiment the oil pump or pump assembly 24 is a gear rotary pump, however, it should be noted that any other type of pump may be used such as the alternate embodiment self-sealing planetary rotor pump 40 as shown in FIG. 8. The oil pump 24 is in contact with the pressure plate 38 via a seal disc 42 which is part of the pump assembly 24. The seal disc 42 will seal the gear pump 24 off from the clutch pack side 18 of the torque transfer device 10. As shown in FIG. 7, the seal disc 42 is generally circular. The seal disc 42 has an inner opening 44 that is circular. The seal disc 42 also includes a plurality of tabs 46 which extend from the outer circumference of the seal disc 42. In the preferred embodiment four tabs 46 are used but any other number may be used depending on manufacturing requirements. As shown in FIG. 7, the seal disc tabs 46 extend through orifices 48 in the pump housing 20. Furthermore, the seal disc tabs 46 engage with and are rotationally able to move within channels 50 located in the clutch pack housing 28. Therefore, the seal disc 42 and pump housing 20 have a predetermined degree of rotational movement within the clutch pack housing 28 which allows the pump housing 20 to index into at least two different positions dependent on the speed differences direction across the pump 24.

Figure 4:
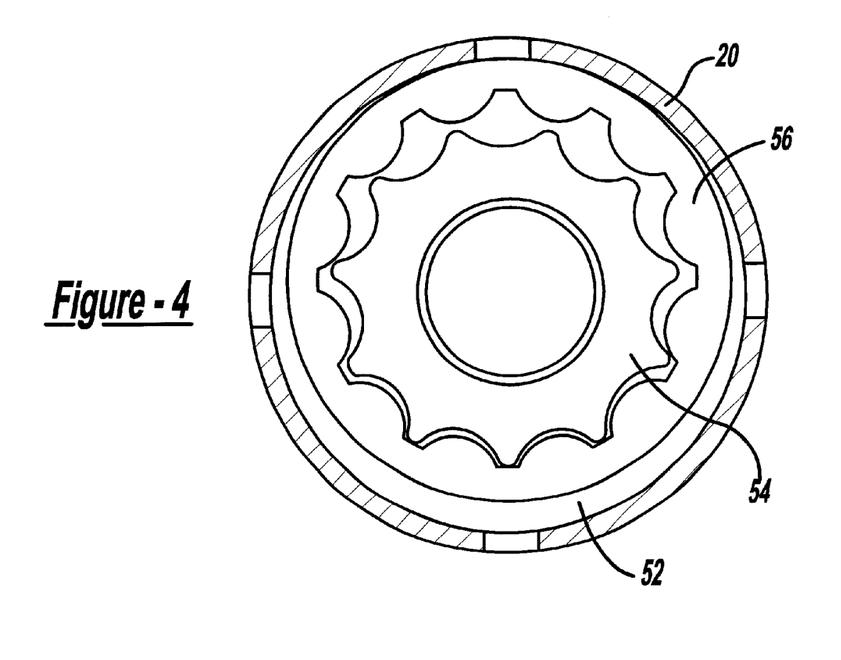
FIG. 4 shows a side view of the gear rotary pump.
Figure 5:
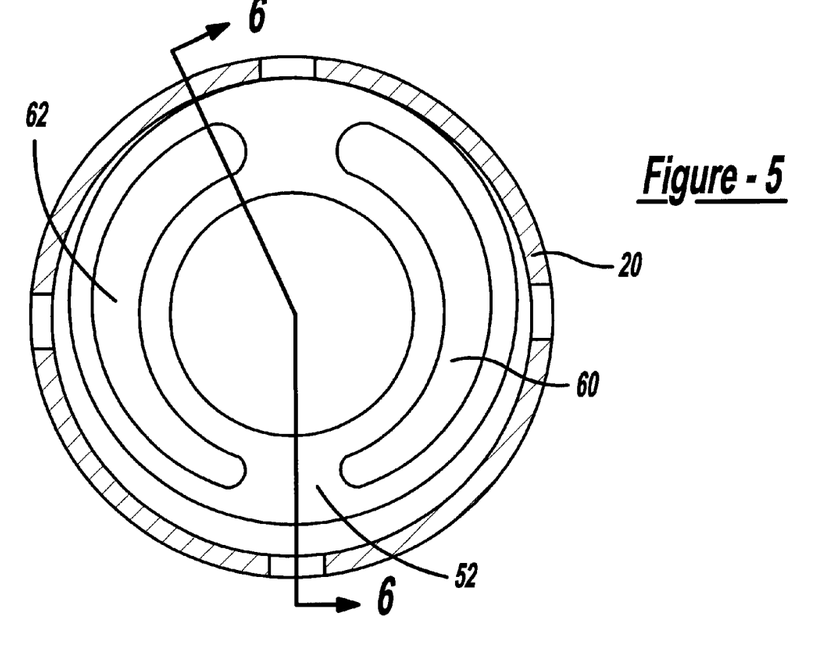
FIG. 5 shows a side view of the pump housing.
Figure 6:
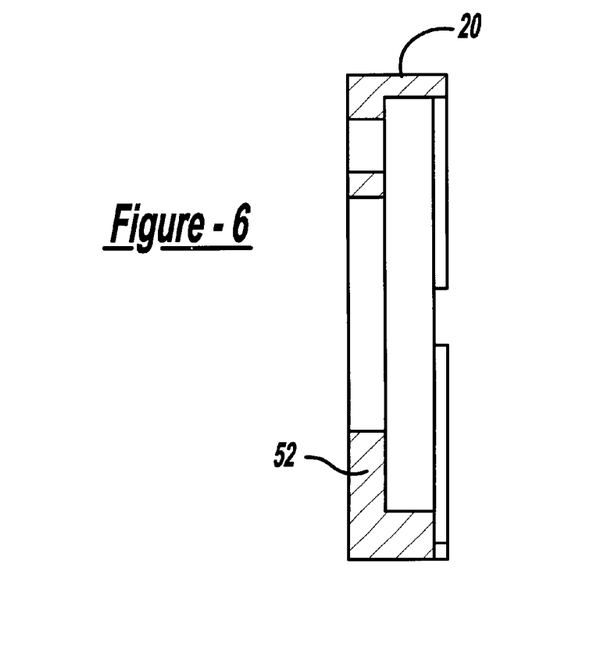
FIG. 6 shows a cross section of the pump housing taken along line 6—6 of FIG. 5.

Axially adjacent to the seal disc 42 is the pump housing 20. Within the oil pump housing 20 are the two pump gears (54,56). The first pump gear 54 is rotatably connected to the output speed of the pinion shaft 14 while the second pump gear 56 is arranged in the pump housing 20. The pump housing 20 is connected, via friction, to the pump housing 20 which spins at the input prop shaft speed. The pump housing 20 as shown in FIGS. 4, 5, and 6 shows the outer pump or second pump gear 56 with relation to the inside or first pump gear 54. Also, shown within the pump housing 20 are a first channel or inlet orifice 60 and a second channel or outlet orifice 62 which allow for a suction side and pressure side to be developed within the pump itself. As shown in FIG. 1, the first channel 60 in the oil pump body creates the pressure side of the hydraulic circuit while the second channel 62 of the pump body creates the suction side of the hydraulic circuit.

Figure 3:
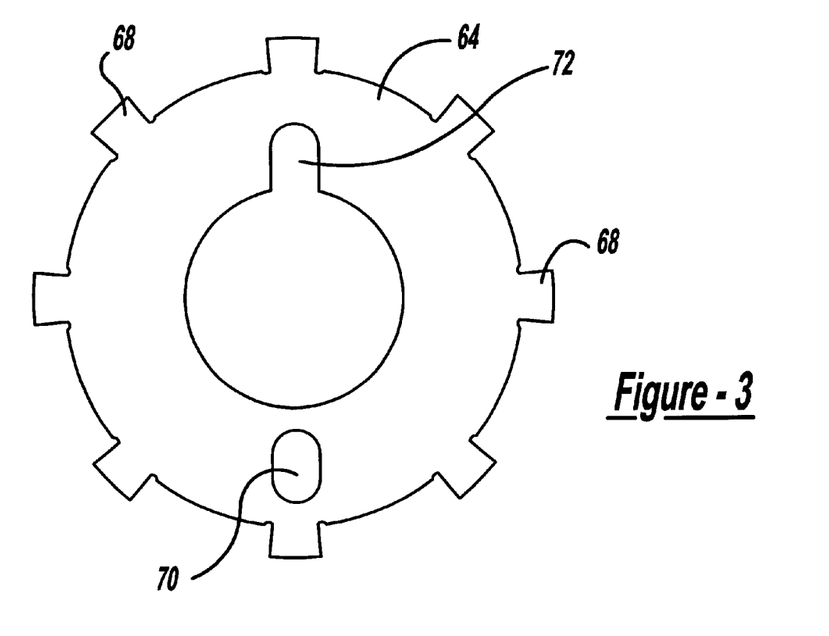
FIG. 3 shows a side view of the control disc.

Axially adjacent to and in contact with the oil pump housing 20 is the control disc 64. The control disc 64 will seal the pump 24 with respect to the piston side of the torque transfer device 10 and will also control the inlet and outlet orifices (60, 62) of the pump 24. The control disc 64 will rotate with the input prop shaft speed and slide against the stationary piston 66 which is axially adjacent to the control disc 64 on the opposite side of the pump 24. The control disc 64 is rotationally fixed with respect to the clutch pack housing 28. As shown in FIG. 3, the control disc 64 has a plurality of tabs 68 extending from the outer circumference thereof. The control disc 64 also includes a pressure channel 70 and a suction slot 72 therein. The angular orientation between the control disc 64 and the pump housing 20 will change in accordance with the slip speed direction from the input prop shaft speed. Therefore, the control disc 64 will move to a predetermined location depending on if the vehicle is moving in a forward direction or if it is in its reverse gear moving in a reverse direction when the slip conditions occur.

Axially adjacent to and in contact with the control disc 64 on a side opposite from the oil pump housing 20 is the piston 66. The piston 66 is part of the hydraulic system 26 of the torque transfer device 10. A bevel spring 74 behind the piston 66 will preload the pump/clutch pack arrangement unit to seal it and improve the response time. The bevel spring 74 is a disc spring in the preferred embodiment, but it should be noted that any other type of spring known in the art may also be used. The hydraulic system 26 includes a hydraulic circuit 76 having a hydraulic body 78 which is connected to an axle housing 80. The axle housing 80 is then connected to the differential drive 12 and is stationary with respect thereto. The hydraulic circuit 76 includes a first pressure orifice 82 and a second pressure orifice 84. Within the hydraulic body 78 is the pressure side channel 86. The pressure side channel 86 moves through a first strainer 88 and then into the axle housing 80 and through the second orifice 84 until it comes to a first ring chamber 90 which surrounds the pinion shaft 14. The pinion shaft 14 includes a slot 92 that will recirculate the exhausted oil under pressure back to the clutch pack 18 for lubrication and cooling. A hydraulic valve 114 in the hydraulic circuit 76 will control and feed the pump 24 while the channels provide the hydraulic circuitry to move the oil. The pressure side channel 86 also is connected to a solenoid 94 which is electronically connected to the vehicle onboard computers. The solenoid 94 will be able to act as an on/off switch capable of relieving all pressure if a high pressure situation develops a locking of the system is not desired, such as an anti-lock brake situation, towing of the car or vehicle stability control via brake intervention. The solenoid 94 can also act as a changing orifice, ie., it can change the characteristics of the torque transfer device 10 by regulating the amount of pressure being applied to the piston 66 which in turn will engage the clutch pack 18 at varying forces.

The torque transfer device 10 may also include a thermal switch 96 which will monitor the temperature in the differential drive and if the oil or the overall temperature of the differential drive exceeds a predetermined value, the relief valve 98 will open relieving pressure thus disengaging the secondary driven axle during the overheating conditions. The relief valve 98 is also set up such that at a predetermined torque level it will engage and relieve pressure from the hydraulic system such that further damage does not occur to the differential drive and other driveline components.

On the suction side of the pump 24, oil is sucked from the oil reservoir 100 in the differential drive through an oil strainer 102 up through the suction channel 104 of the hydraulic circuit. The suction channel 104 includes a backflow valve 106 which will only allow oil to be sucked into the pump and not returned to the oil reservoir in the differential drive via the suction channel 104. Once the oil is sucked into the ring chamber 108 around the pinion shaft 14, the oil will be sucked into the pump 24 via the suction slot 72 and the interior space around the pinion shaft 14 of the oil pump body 52 and control disc 64. The pinion shaft 14 is rotatably connected to the differential drive and will send torque to the rear half shafts or side shafts during slip conditions of the front wheels. A first shaft seal 110 and a second shaft seal 112 are located between the spinning pinion shaft 14 and the axle housing 80 to force the backflow of the hydraulic circuit 76 into the clutch pack 18 for cooling. It should be noted that in an alternate embodiment the thermal switch 96 is not needed because an ambient temperature of the differential housing would be taken by an onboard vehicle computer which then can send an on or off signal, depending on if there is a high temperature, to the solenoid 94 to relieve the hydraulic pressure thus disengaging the rear drive.

As shown in FIG. 8 an alternate embodiment of the present invention is the use of the self-sealing planetary rotor pump instead of the gear rotor pump. The planetary rotor pump 40 includes a pump housing 120 and pump body 122. The planetary rotor pump 40 further includes an inner pump gear 124 which has teeth 126 on both its inner surface which connects to the pinion shaft and its outer surface. The inner pump gear 124 has the teeth so that it can mesh with a plurality of outer planetary pump gears 128. In the alternate embodiment there are seven outer planetary rotor gears 128 which also include teeth that mesh with the teeth on the inner gear of the planetary rotor pump. It should be noted that any other number of outer gears may also be used depending on the characteristics required from the pump.

In operation, the torque transfer device 10 is sensitive to any speed difference between the input speed, which is rotating at the speed of the primary driven axle, and the pinion shaft 14 of the secondary axle. Any speed difference will make the gear rotary pump 24 start its pumping process and pump oil from the oil reservoir 100 through the oil strainer 102 and into the suction channel 104 and the ring chamber 108. The oil will then enter the pump from the inlet channel 62 via the suction slot 72 of the control disc 64 and be spun around in the pump and then exited under pressure through the pressure channel 60. The oil then enters the pressure channel and moves through pressure orifices 82, 84 into the hydraulic valve arrangement 114 to create a hydraulic pressure that will act upon the piston 66. This pressure will push the piston 66 in an axial direction forcing the pump 24 which includes the control disc 64 and the sealing disc 42 against the clutch pack 18 which will engage the clutch pack. As the clutch pack 18 is engaged the clutch hub 22 will begin to rotate at a faster rate thus increasing the speed of the pinion shaft 14 which will send power to the rear axle and wheels. As noted earlier, the hydraulic circuit 76 includes a hydraulic orifice valve 114, which converts the speed dependent oil flow into a speed dependent pressure. The externally controlled shutoff valve controlled by solenoid 94 will allow the system to be turned of instantaneously during anti-lock braking and vehicle stability control activation. The solenoid 94 may also be used to create an infinite flexibility in tuning the torque transfer characteristics within the differential drive.

While in operation some portions of the pump 24 will be spinning at the input speed while the hydraulic circuit 76 and piston 66 will be stationary with respect to the pump 24. The hydraulic circuit 76 does not use inlet and outlet control valves such as ball and spring valves, for the gear pump to separate the pressure from the suction side of the pump. The control disc 64 is the interface between the pump 24 and the hydraulic circuit 76. The control disc 64 will rotate with the input shaft speed while it slides against the stationary piston 66. This contact face made between the control disc 64 and piston 66 will be loaded with the piston force and will seal off the pressure side of the pump 24. The suction slot 72 on the control disc 64 will connect the suction side of the gear pump 24 with the oil supply channel 104. The piston 66 and control disc 64 will encounter minimal friction while having maximum durability which will be needed to counteract the high speed difference between the two. The load being applied to the control disc 64 is proportional to the piston force and will only be relevant while the torque transfer device 10 system is engaged. The increasing pressure from the piston 66 will force the control disc 64 axially into the entire pump system. Therefore, the sealing disc 42, the pump gears (54, 56), the pump body 52, and the control disc 64 will be axially moved toward the clutch pack 18 which will tighten up all seals and will improve the overall sealing of the pump assembly by a self-sealing effect.

While the control disc 64 is rotationally fixed to the clutch pack housing 18, the pump housing 20 along with the sealing disc 42 will have a certain degree of rotational freedom or movement with respect to the clutch pack housing 18. This will allow for the indexing of the seal disc 42 and pump housing 20 into at least two different positions dependent on the speed differences direction across the pump. Therefore, this will furthermore allow for an angular orientation between the control disc 64 and pump housing 20 to change in accordance with the slip speed direction of the motor vehicle i.e., either a forward motion slip or a rear motion slip of the vehicle. These changes in the orientation of the suction slot 72 and pressure channel 70 on the control disc 64 in relation to the inlet channel 60 and the outlet channel 62 of the pump body 52 will always assure a connection of the suction side of the pump with the suction slot 72 in the control disc 64 and the pressure side of the pump with the pressure channel 70 in the control disc 64. This will allow seamless working of the torque transfer device 10 in either the reverse vehicle direction or the usual forward vehicle direction.

When the front wheels of the primary driven axle encounter a slip condition the prop shaft speed will increase which will increase the rotational velocity of the companion flange 16 and clutch pack housing 18. This will in turn rotate the pump body 52 which by friction will begin rotating the outer pump gear 56 at the same high rate of speed. All the time this is occurring the rear axle and therefore rear pinion shaft 14 is rotating at the pull-along or hang on speed of the rear wheels. Once the speed difference is detected it starts the pumping of the oil from the oil sump through the oil pump gearing, this then will increase the pressure going into the pressure side channels of the hydraulic circuit 76 which will create a force which will axially move the piston 66 into the control disc 64. This axial movement will move the entire pump assembly into the clutch pack 18 and clutch discs 36. This will engage the clutch discs 36 so that they will begin to rotate faster which will make the clutch hub 22 rotate faster and thus, increase the torque and speed being delivered to the pinion shaft 14. This increasing speed and torque will then be delivered to the rear wheels such that the vehicle is moved away from the slip conditions of the road with help from the secondary drive rear wheels. Once the slip condition of the front wheels ceases the prop shaft will return to its normal driving speed thus reducing the effect of the rotating gears within the pump and slowly disengaging the clutch pack such that the rear wheels will settle at their hang-on speed in the all wheel drive vehicle drive train. Once there is no difference between the input and output speed the hydraulic circuit will disengage so the vehicle becomes a primarily driven front wheel drive once again. It should be noted that while the piston 66 is stationary this makes control of the pressure side of the pump easier and the tuning of the torque transfer device 10 much easier. In a traditional hydraulic torque transfer device ball valves or other valves were needed to separate pressure from the suction side within the pump. In the current invention indexing of the control disc 64 with respect to the housing creates the same effect.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A torque transfer device comprising:
   a housing;
   a clutch assembly rotatably supported within said housing;
   a pump assembly connected to said clutch assembly on one side thereof; and
   a hydraulic assembly in contact with said pump assembly on a side opposite of said clutch assembly, wherein said hydraulic assembly is rotatably stationary with respect to said pump assembly.

2. The torque transfer device of claim 1 wherein said pump assembly includes a control disc, which interfaces with said hydraulic assembly.

3. The torque transfer device of claim 2 wherein said control disc has a plurality of tabs extending from an outside circumference.

4. The torque transfer device of claim 3 wherein said tabs are separated by a predetermined angle.

5. The torque transfer device of claim 2 wherein said pump assembly creates a pressure side and suction side in the torque transfer device with said control disc.

6. The torque transfer device of claim 2 wherein said control disc is rotationally fixed to a clutch pack housing.

7. The torque transfer device of claim 1 wherein said pump assembly includes a pump housing and a seal disc, said seal disc and said pump housing having a predetermined degree of rotational movement with respect to a clutch pack housing of said clutch assembly.

8. The torque transfer device of claim 7 wherein said pump housing and said sealing disc index to at least two positions depending upon speed difference direction across said pump assembly.

9. The torque transfer device of claim 8 wherein an angular orientation between a control disc and said pump housing changes depending on a slip speed direction.

10. The torque transfer device of claim 9 wherein said control disc includes a pressure channel and a suction slot, said pressure channel and said suction slot are always connected to a pressure side and a suction side of said pump assembly.

11. The torque transfer device of claim 1 further including a solenoid.

12. The torque transfer device of claim 11 wherein said solenoid operates as a switch to disengage the torque transfer device.

13. The torque transfer device of claim 11 wherein said solenoid operates as a tuning device which controls and changes characteristics of the torque transfer device.

14. The torque transfer device of claim 1 wherein said hydraulic assembly engages said pump assembly and axially moves said pump assembly into said clutch assembly creating a self sealing effect.

15. A differential drive, said differential drive including:
   a differential housing;
   a flange rotatably connected to said differential housing, said flange rotates at an input speed;
   a pinion shaft that rotates at an output speed;
   a torque transfer device connected to said flange and said pinion shaft, said torque transfer device including a clutch pack housing rotatably connected to said flange, said clutch pack housing having a clutch pack therein, a pump having a pump housing, said pump rotatably connected to said clutch pack housing and axially adjacent thereto, a piston and a hydraulic circuit stationary with respect to said pump, a control disc in contact with said pump and said piston, said control disc rotates with said flange and slides against said stationary piston, said control disc is rotationally fixed with respect to said clutch pack housing, a seal disc engaging said pump and said clutch pack, said seal disc having a predetermined degree of rotation with respect to said pump housing, said seal disc indexes to at least two positions, said indexing changes an angular orientation between said control disc and said pump housing to insure a suction side of said pump aligns with a suction slot of said control disc and a pressure side of said pump aligns with a pressure channel of said control disc.

16. The differential drive of claim 15 further including a solenoid, said solenoid tunes characteristics of said torque transfer device.

17. The differential drive of claim 15 wherein said pump is a gear rotary pump.

18. The differential drive of claim 15 wherein said pump is a self sealing planetary rotor pump.

19. The differential drive of claim 15 wherein said piston engages and axially moves said pump and said sealing disc against said clutch pack to create a self sealing effect.

20. A torque transfer device for use in an all wheel drive vehicle, said torque transfer device including:

a rotatably mounted clutch pack housing, said clutch pack housing having a clutch pack therein, said clutch pack having a clutch hub, said clutch hub rotating at an output speed, said clutch pack rotating at an input speed;

a seal disc in contact with said clutch pack, said seal disc having a predetermined degree of rotation with respect to said clutch pack housing;

a pump in contact with said seal disc, said pump rotatably connected to said clutch pack housing;

a control disc in contact with said pump on a side opposite of said seal disc, said control disc rotates at said input speed and is rotationally fixed with respect to said clutch pack housing; and a piston and hydraulic circuit, said piston is stationary and contacts said control disc at an interface which seals a pressure side of said pump, said piston applies a load on said control disc that is proportional to a force that increases with pressure.

\* \* \* \* \*